United States Patent
Turgeman et al.

(10) Patent No.: US 12,407,723 B2
(45) Date of Patent: Sep. 2, 2025

(54) SYSTEM, DEVICE, AND METHOD OF PROTECTING USERS AND ONLINE ACCOUNTS AGAINST ATTACKS THAT UTILIZE SIM SWAP SCAMS

(71) Applicant: IRONVEST, INC., New York, NY (US)

(72) Inventors: Avi Turgeman, New York, NY (US); Kfir Yeshayahu, Tzur Yigal (IL); Guy Bauman, Brookline, MA (US); Yaron Dror, Brookline, MA (US); Erez Zohar, Hoboken, NJ (US)

(73) Assignee: IRONVEST, INC., New York, NY (US)

( * ) Notice: Subject to any disclaimer, the term of this patent is extended or adjusted under 35 U.S.C. 154(b) by 740 days.

(21) Appl. No.: 17/693,601

(22) Filed: Mar. 14, 2022

(65) Prior Publication Data

US 2023/0291766 A1    Sep. 14, 2023

(51) Int. Cl.
*H04L 29/00* (2006.01)
*H04L 9/40* (2022.01)

(52) U.S. Cl.
CPC ...... *H04L 63/1483* (2013.01); *H04L 63/1433* (2013.01); *H04L 63/205* (2013.01)

(58) Field of Classification Search
CPC ............. H04L 63/1483; H04L 63/1433; H04L 63/205; H04L 63/1441; H04L 63/1491
See application file for complete search history.

(56) References Cited

U.S. PATENT DOCUMENTS

| | | | | |
|---|---|---|---|---|
| 7,654,447 | B1 * | 2/2010 | Barth | G06Q 20/04 705/45 |
| 9,294,890 | B1 * | 3/2016 | Boutcher | H04W 4/14 |
| 10,277,628 | B1 * | 4/2019 | Jakobsson | H04L 63/1483 |
| 10,379,995 | B1 * | 8/2019 | Walters | G06F 17/16 |
| 10,425,783 | B1 * | 9/2019 | Caldwell | H04W 4/14 |
| 10,880,322 | B1 * | 12/2020 | Jakobsson | H04L 51/08 |
| 11,102,244 | B1 * | 8/2021 | Jakobsson | H04L 51/42 |
| 11,757,914 | B1 * | 9/2023 | Jakobsson | H04L 51/42 726/25 |
| 2006/0068755 | A1 * | 3/2006 | Shraim | H04M 15/47 455/410 |
| 2006/0069697 | A1 * | 3/2006 | Shraim | H04L 63/1441 707/999.102 |
| 2007/0192853 | A1 * | 8/2007 | Shraim | G06Q 10/107 726/22 |

(Continued)

*Primary Examiner* — Don G Zhao
(74) *Attorney, Agent, or Firm* — AlphaPatent Associates Ltd.; Daniel J. Swirsky

(57) ABSTRACT

Systems, and methods of protecting users against cyber-attacks that utilize SIM Swap or Email Hijacking. A method includes: (a) detecting that a user is requested to input his genuine email address into an email address field of an account profile page or an account settings page of a computerized service; (b) inserting, into that email address field of that page, a replacement email address that replaces a genuine email address of the genuine user at that computerized service; and later, (c) automatically monitoring and handling, continuously at a remote server or a remote service, incoming email messages that arrive to that replacement email address of that genuine user and that request the genuine user to perform an elevated-security operation or to reset his credentials for accessing that computerized service.

14 Claims, 1 Drawing Sheet

(56) References Cited

U.S. PATENT DOCUMENTS

| | | | |
|---|---|---|---|
| 2007/0299777 A1* | 12/2007 | Shraim | H04L 51/212 705/51 |
| 2007/0299915 A1* | 12/2007 | Shraim | H04L 63/1491 709/229 |
| 2009/0198587 A1* | 8/2009 | Wagner | G06Q 30/0281 705/26.1 |
| 2012/0239438 A1* | 9/2012 | Hemmings | G06Q 40/08 705/4 |
| 2013/0340028 A1* | 12/2013 | Rajagopal | H04L 63/10 726/1 |
| 2014/0073292 A1* | 3/2014 | Kim | H04W 12/069 455/411 |
| 2014/0195626 A1* | 7/2014 | Ruff | H04W 12/086 709/206 |
| 2014/0199664 A1* | 7/2014 | Sadeh-Koniecpol | G06F 21/564 434/118 |
| 2015/0058923 A1* | 2/2015 | Rajagopal | H04L 63/1433 726/1 |
| 2016/0277439 A1* | 9/2016 | Rotter | H04L 63/0861 |
| 2016/0294837 A1* | 10/2016 | Turgeman | G06F 21/316 |
| 2016/0378877 A1* | 12/2016 | Khemka | G06F 16/9554 235/375 |
| 2017/0103674 A1* | 4/2017 | Sadeh-Koniecpol | G06F 21/566 |
| 2017/0180378 A1* | 6/2017 | Tyler | H04L 63/1433 |
| 2017/0244746 A1* | 8/2017 | Hawthorn | G06F 21/55 |
| 2020/0007502 A1* | 1/2020 | Everton | H04L 51/063 |
| 2020/0053111 A1* | 2/2020 | Jakobsson | H04L 63/1416 |
| 2020/0067861 A1* | 2/2020 | Leddy | G06F 21/6245 |
| 2020/0082108 A1* | 3/2020 | Griffin | G06F 21/31 |
| 2020/0349289 A1* | 11/2020 | Roundtree | H04L 51/48 |
| 2020/0358798 A1* | 11/2020 | Maylor | H04L 63/1433 |
| 2021/0058395 A1* | 2/2021 | Jakobsson | H04L 67/306 |
| 2021/0084071 A1* | 3/2021 | Mandrychenko | H04L 63/1483 |
| 2022/0006823 A1* | 1/2022 | Tse | H04L 41/147 |
| 2022/0092495 A1* | 3/2022 | Brannon | G06F 21/6245 |
| 2022/0311730 A1* | 9/2022 | Le Jouan | H04L 67/02 |
| 2023/0073905 A1* | 3/2023 | Cavallaro | H04L 63/1483 |
| 2023/0177512 A1* | 6/2023 | Laptiev | G06Q 20/4016 705/44 |
| 2023/0362651 A1* | 11/2023 | Lie | H04W 12/30 |
| 2024/0273508 A1* | 8/2024 | Zou | G06Q 20/12 |

* cited by examiner

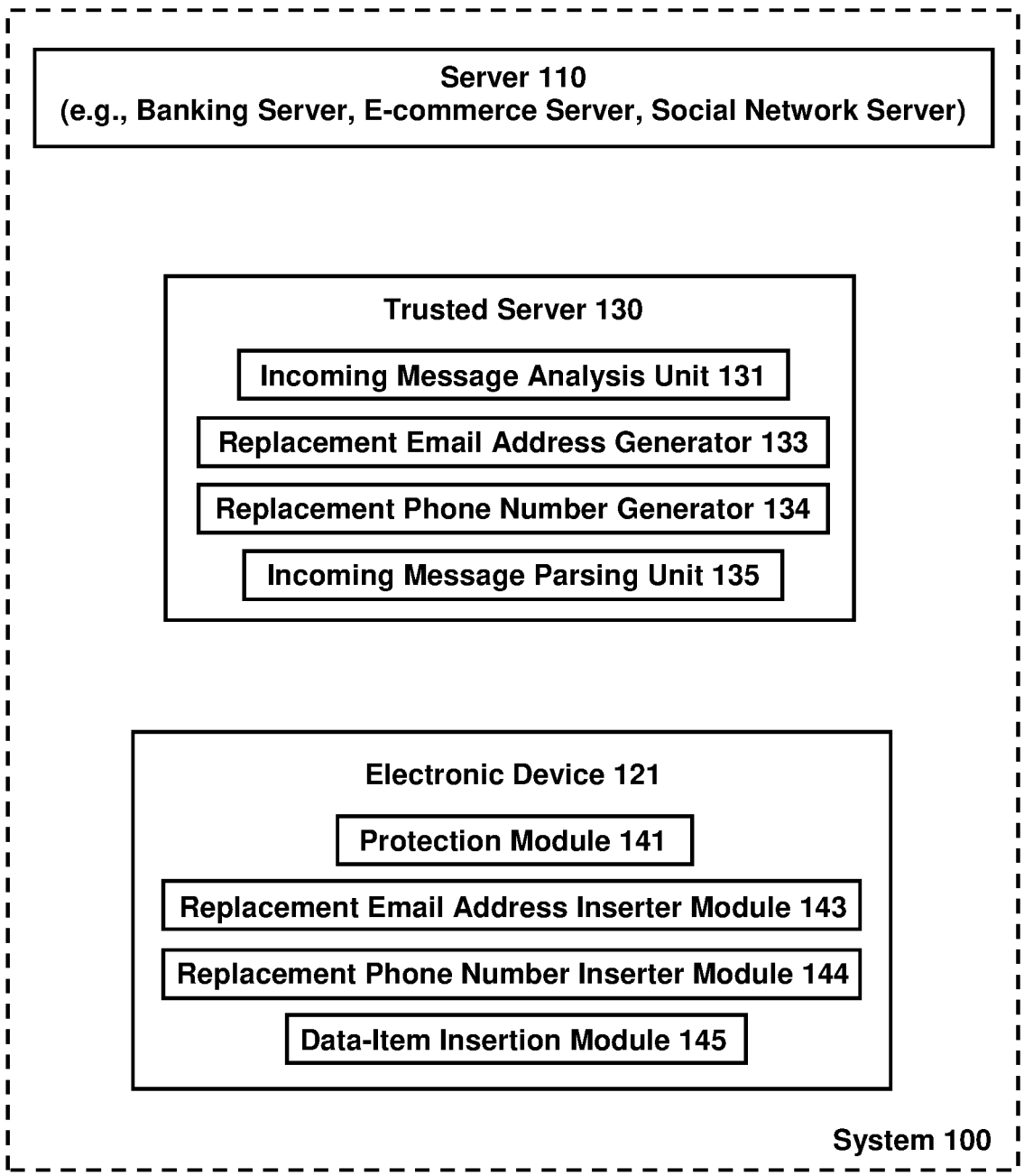

SYSTEM, DEVICE, AND METHOD OF PROTECTING USERS AND ONLINE ACCOUNTS AGAINST ATTACKS THAT UTILIZE SIM SWAP SCAMS

FIELD

Some embodiments are related to the field of electronic devices and computerized systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

SUMMARY

Some embodiments provide include devices, systems, and methods of protecting users (and their accounts) against cyber-attacks that utilize a SIM Swap scams and/or an Email Account Hijackings.

For example, a method includes: (a) detecting that a user is requested to input his genuine email address into an email address field of an account profile page or an account settings page of a computerized service; (b) inserting, into that email address field of that page, a replacement email address that replaces a genuine email address of the genuine user at that computerized service; and later, (c) automatically monitoring and handling, continuously at a remote server or a remote service, incoming email messages that arrive to that replacement email address of that genuine user and that request the genuine user to perform an elevated-security operation or to reset his credentials for accessing that computerized service.

For example, a method includes: (a) detecting that a user is requested to input his genuine phone number into a phone number field of an account profile page or an account settings page of a computerized service; (b) inserting, into said phone number field of said page, a replacement phone number that replaces a genuine phone number of said genuine user at said computerized service; later, (c) automatically monitoring and handling, continuously at a remote server or remote service, incoming SMS text that arrive to said replacement email address of said genuine user and that request the genuine user to perform an elevated-security operation or to reset his credentials for accessing said computerized service.

For example, a process includes: in a computerized system that uses a particular type of Authentication Factor, replacing (i) a genuine end-user Contact Data-Item or Personal Account Information Item, that is utilized by said Authentication Factor for elevated-security transactions or activity, with (ii) a Replacement Contact or a Replacement Account Information Item, that is exclusively controlled and monitored by a trusted service and not by the genuine end-user an Contact Data-Item or Personal Account Information Item of said genuine end-user. Messages that said computerized system conveys via said Authentication Factor, are not directly delivered to the Contact Data-Item or Personal Account Information Item of said genuine end-user, but rather, are delivered to said Replacement Contact that is exclusively controlled and monitored by said trusted service, and wherein said messages become accessible to said genuine end-user only via a secure communication channel that is a different communication channel from said Authentication Factor.

Some embodiments may provide other and/or additional benefits or advantages.

BRIEF DESCRIPTION OF THE DRAWINGS

FIG. 1 is a schematic block-diagram illustration of a system, in accordance with some demonstrative embodiments.

DETAILED DESCRIPTION OF SOME DEMONSTRATIVE EMBODIMENTS

Some embodiments provide systems, methods, and devices for protecting against a cyber-attack, or a compromise of a bank account or other online account, which utilizes (directly or indirectly) a SIM Swap attack, a SIM swap scam, a SIM-jacking attack, a port-out attack, a SIM splitting attack, a "Smishing" attack, an email hijacking attack, and/or a similar attack.

For example, a legitimate user or a "genuine user" has an account at a computerized service; for example, an online account at a computerized service of a bank, which allows that user to view and perform banking transactions via a web browser and/or via a native application or "app". For example, the user is typically required to enter his username (or his email address) and his password, in order to get authorization to access his banking information.

The Applicants have realized that in a SIM Swap attack, an attacker utilizes another computer (or another computing device) and requests to reset the password of the genuine user. Often, the server of the computerized service performs a password reset process, that typically involves sending an SMS text message to a phone number that the server has on record for the genuine user, with a limited-time link for resetting the password, or with a one-time password (OTP) that is required for resetting the password. However, without the knowledge of the genuine user, the attacker has already managed to take over the phone number of the genuine user; for example, by persuading a junior Customer Service Representative of a mobile phone company that the attacker is actually the genuine user and by claiming that he has lost his phone and needs a new SIM card for his regular phone number. Therefore, the attacker (and not the genuine user) receives the password reset SMS text from the bank's server; and the attacker (and not the genuine user) performs the password reset process and gains control over the bank account of the genuine user.

Similarly, realized the Applicants, a similar attack may be performed by hijacking or compromising an email address of the genuine user. For example, an attacker is able to guess the email address password of a genuine user, or steals the email address password from the genuine user by one or more ways (e.g., by observing the genuine user typing it at a coffeeshop; by obtaining or purchasing a list of previously-hacked or previously-compromised email accounts that includes email addresses and their passwords; by guessing the password of the email account; or the like). Once the attacker has control over the email account of the genuine user, the attacker proceeds to request a Password Reset at the website of the bank where the genuine user has an account (e.g., which may be deduced by reviewing emails in that email account); and thus gains control over the bank account of the genuine user.

The Applicants have realized that there is a need to protect users, accounts, providers, organizations, and computerized systems, against SIM Swap attacks, email hijacking attacks, and similar attacks.

In accordance with some embodiments, protection is provided by replacing the phone number and/or email address, that the bank (or other entity) stores in the profile or account settings of the genuine user, with a Replacement Phone Number or a Replacement Email Address; that is generated by a trusted entity (e.g., a company that provides protection services against such cyber-attacks); and that is not generated and is not selected by the end-user; and that is not generated and is not selected by the server that provides the computerized service (e.g., not generated by the server of the bank); and that is not even known to the end-user. Then, the trusted entity monitors, continuously, incoming email messages that arrive to the Replacement Email Address, as well as incoming voice phone calls and incoming SMS text messages that arrive to the Replacement Phone Number. Incoming messages are analyzed by a remote server of the trusted entity. If an incoming message is determined to be associated with a Password Reset or Password Recovery or Password Change process (or with other pre-defined, security-related, processes; or with other pre-defined elevated-security transactions, such as a wire transfer), then the remote server of the trusted entity blocks or prevents or avoids the delivery of the incoming message, to the genuine user; and instead, the remote server notifies that genuine user that a suspicious incoming message has arrived, and/or that his account is possibly under attack right now; and invites the genuine message to log-in into the website (or app, or interface) of the trusted entity in order to verify his identity and in order to further command the system how to handle the incoming message. If the incoming message is not associated with a Password Reset or Password Recovery or Password Change process (or with other pre-defined, security-related, processes; or with other pre-defined elevated-security transactions, such as a wire transfer), then the remote server of the trusted entity forwards or otherwise conveys or relays the incoming message to the genuine email address/phone number of the genuine user.

Reference is made to FIG. 1, which is a schematic block-diagram illustration of a system 100, in accordance with some demonstrative embodiments. System 100 includes, for example, a Server 110 of a Protected Computerized Service; for example, a server of a bank, a server of an online retailer or vendor, a server of a social network, or the like. Server 110 may be in communication with a plurality of end-users. For example, end-user Adam utilizes his electronic device 121 (e.g., smartphone, laptop computer, desktop computer, tablet) to access his bank account; and another end-user may utilizes her electronic device to access her bank account.

For example, end-user Adam installs on his electronic device 121 a Protection Module 141, which is provided by a trusted entity that runs and controls a Trusted Server 130. The Protection Module 141 may be a stand-alone application or "app" or mobile app, or an application that can run in the background or in parallel to other applications, or a web browser, or an integral component of a web browser, or a web browser extension, or a web browser add-on, or a web browser plug-in, or an updated or upgraded version of a previous web browser. In some embodiments, Protection Module 141 may be configured to have capabilities or functionalities that enable it to monitor interactions of a user with a website or with another app or with a mobile app, and/or to intercept such interactions, and/or to insert or write or over-write or replace or modify or inject values or numbers or strings into particular fields or forms or interface components that are shown in a web browser and/or via another application or app; optionally by utilizing HTML5 and/or JavaScript and/or CSS and/or other programming techniques.

End-user Adam may access the Trusted Server 130 and creates his genuine personal account; for example, providing to Trusted Server 130 the genuine real-life name of Adam, his billing address, his default shipping address, optionally his payment data (e.g., credit card data to be stored securely at Trusted Server 130), his real-life genuine email address (e.g., "Adam@Real.com"), his real-life genuine phone number, optionally his date-of-birth (DOB), and/or other suitable data. Adam defines a username and a strong password for accessing or modifying his personal account at Trusted Server 130. It is noted that in some embodiments, a decentralized architecture may be used, and/or a peer-to-peer architecture may be used; such that some or all of the functionalities of Trusted Server 130, may be performed by the Protection Module 141 itself, and/or by a non-centralized Node or Peer on a network, or by a Trusted Remote Service which may be de-centralized rather by a centralized Trusted Server.

Later, end-user Adam visits a website of Bank-A, or installs and runs the mobile application of Bank-A; and proceeds to open a bank account via an online interface having one or more forms with fillable fields For example, Bank-A requests from Adam to enter his first name, his last name, his home address, his phone number, his email address, his date-of-birth, or the like.

Protection Module 141, which runs on the electronic device 121 of user Adam, monitors the interactions and detects that user Adam is requested to fill-out these fields. Protection Module 141 automatically inserts the relevant data-items into the relevant fields of the Bank-A interface; the data-items are taken from the user profile of Adam at Trusted Server 130. However, instead of inserting the real-life genuine email address of user Adam (e.g., "Adam@Real.com") into the "email address" field in the interface of Bank-A, the Protection Module 141 automatically inserts there a Replacement Email Address (e.g., "4729335@Trusted.com"). The Replacement Email Address is accessible and controllable only by Trusted Server 130, and not by user Adam, and not by his electronic device 121, and not by the server 110 of Bank-A, and not by an app or a mobile app of Bank-A.

Optionally, in some embodiments, the Replacement Email Address is not even displayed to user Adam on his device 121; such that even user Adam does not know (in some implementations) the Replacement Email Address that was generated and inserted on his behalf into the "email address" field of Bank-A interface (e.g., the Protection Module 141 can display an overlay white box over the "email address" field of the Bank-A interface, to hide the content of that field from user Adam).

Similarly, instead of inserting the real-life genuine phone number of user Adam (e.g., "917-444-6666") into the "phone number" field in the interface of Bank-A, the Protection Module 141 automatically inserts there a Replacement Phone Number (e.g., "646-222-3333"). The Replacement Phone Number is accessible and controllable only by Trusted Server 130, and not by user Adam, and not by his electronic device 121, and not by the server 110 of Bank-A, and not by an app or a mobile app of Bank-A.

Optionally, in some embodiments, the Replacement Phone Number is not even displayed to user Adam on his device 121; such that even user Adam does not know (in some implementations) the Replacement Phone Number that was generated and inserted on his behalf into the "phone number" field of Bank-A interface (e.g., the Protection Module 141 can display an overlay white box over the "phone number" field of the Bank-A interface, to hide the content of that field from user Adam).

Later, user Adam sits an a coffeeshop and logs-in to his real-life email account ("Adam@Real.com"). Attacker Mallory is standing behind him, and she performs a Shoulder Surfing Attack: she observes user Adam as he types his username (on his screen) and his password (by looking carefully at his keyboard while he types). Attacker Mallory thus obtained, by careful observation in a public or semi-public place, the email account credentials of user Adam, in this way or in other ways (e.g., purchasing a bulk list of already-compromised credentials). Attacker Mallory sees that user Adam used his Bank-A debit card to pay at the coffeeshop, and thus she estimates that user Adam has a bank account at Bank-A. Attacker Mallory uses her laptop to access the website of Bank-A; it requires the user to enter his email address as his Bank-A username, and his Bank-A password. Attacker Mallory enters the email address of user Adam, that she easily obtained as discussed above. Attacker Mallory then selects "I forgot my Bank-A password and I would like to reset it via email". This causes the server 110 of Bank-A to generate a password reset link, and to send it by email to the email address that Bank-A has on file for user Adam. In a conventional non-protected scenario, Attacker Mallory could have now completed her takeover on the bank account of user Adam at Bank-A, since Attacker Mallory already has full access to the real-life email address of user Adam, and she would receive there via email the email message from Bank-A with the password reset link for the online account of user Adam at Bank-A. However, in accordance with some embodiments, system 100 prevents and blocks such attack; since Bank-A does not have in his records the real-life email address of user Adam, but rather, only the Replacement Email Address that was generated and inserted by the Protection Module 141. Therefore, the email message from Bank-A with the password reset link, is not sent by Bank-A to the real-life genuine email address of user Adam (which Attacker Mallory had already compromised); but rather, to the unique Replacement Email Address that was generated and inserted by the Protection Module 141 that only Trusted Server 130 can access and control.

Trusted Server 130 continuously monitors incoming email messages that arrive to that Replacement Email Address that it had generated for user Adam. Generally, such incoming email messages are expected to be received only from Bank-A, and not from other third-parties; as this is a unique email address that is not known to anyone other than to Bank-A server 110 and to the Trusted Server 130.

Trusted Server 130 detects a first incoming email message that arrived to the Replacement Email Address of user Adam. An Incoming Message Analysis Unit 131 of Trusted Server 130 performs analysis of the incoming email message; for example, textual analysis, Natural Language Processing (NLP) analysis, comparison to (or detection of) pre-defined keywords or terms or phrases or links, or other analysis whose purpose is to detect whether (i) the incoming email message is a Benign email message from Bank-A that merely provides information to user Adam (e.g., "Please note that our branches will be closed on Monday for Memorial Day"); or conversely, (ii) the incoming email message is a Suspicious email message (or a risk-entailing email message, or an elevated-security email message, or a security-related email message) from Bank-A which allows the recipient of such message to perform a password reset or password recovery or password modification process, or which provides to the recipient of such message a unique token or One-Time Password (OTP) or one-time passcode or other data-item which can be used for resetting a password or for confirming a high-risk transaction or an elevated-security transaction (e.g., an outgoing wire transfer).

For example, the Incoming Message Analysis Unit 131 of Trusted Server 130 may check whether the incoming message from Bank-A matches, at least partially, a pre-defined known template of email messages that Bank-A typically sends out to customers for password recovery, or for confirming an outgoing wire transfer; or contains a textual string of the word "password" and the word "reset" in the same sentence; or contains the phrase "Please click this link within 10 minutes to reset your banking password" (e.g., this phrase being pre-defined as one of possible phrases that Bank-A typically utilizes in its regular password reset email messages). In some embodiments, Incoming Message Analysis Unit 131 may operate based on an extensive list of pre-defined rules and keywords, that provide indicators for content that is Benign (e.g., "Memorial Day" or "Federal holiday") or for content that is Suspicious (e.g., "reset your password" or "please confirm this wire transfer"). In some embodiments, Incoming Message Analysis Unit 131 may optionally utilize a Machine Learning (ML) and/or Deep Learning (DL) and/or Artificial Intelligence (AI) and/or Neural Network (NN) engine or unit, which may be pre-trained using a training set of thousands of messages, to classify an incoming message as either Benign or Suspicious.

If the incoming message is determined to be Benign, then: Trusted Server 130 composes a brand-new email message to user Adam, and sends it from Trusted Server 130 to the real-life genuine email address of user Adam (which is known to Trusted Server 130, and which is not know to Bank-A server 110). The brand-new email message may include an introduction portion, such as, "Hello from Trusted Server; we notify you that you received a regular non-suspicious email message from Bank-A"; followed by a copy of the Benign email message (e.g., "Our branches will be closed on Monday for Memorial Day"). This way, the Benign email message from Bank-A is relayed to the real-life genuine email account of user Adam, who can receive it and read it as usual.

In contrast, if the incoming email message from Bank-A (e.g., based on the message content, message structure, links, keywords, or other indicators) is determined by Trusted Server 130 to be Suspicious, or to be associated with an Elevated-Security transaction or an Elevated-Risk activity (e.g., based on a pre-defined list or rules that define such activities or transactions; such as, password reset, password recover, outgoing wire transfer confirmation, loan request, new credit card request, or the like); then, Trusted Server 130 does not forward (does not relay, does not send, and in some embodiments does not even convey or include) the content of that incoming email message to user Adam's real-life email address. Rather, Trusted Server 130 generates and sends to user Adam a message notifying him that an elevated-security email message has arrived from a third-party entity (naming Bank-A in some embodiments; or, in other embodiments, not even mentioning to user Adam the identity or name of the sending entity); and inviting user Adam to log-in into his personal account at Trusted Server 130 in order to view and read and review that incoming message, and in order to command Trusted Server 130 how to handle it. Such notification message to user Adam may be sent by Trusted Server 130 via email to the real-life email address of user Adam (that is known to Trusted Server 130); or, in some embodiments, may be sent to user Adam by another communication channel that was pre-defined by user Adam exactly for the purpose of notifying user Adam about suspicious email messages, such as, a non-email communication channel, or an email message that is sent to another (secondary) real-life email address of user Adam, or an SMS text message to the real-life phone number of user Adam (that is known to Trusted Server 130).

User Adam receives the notification from Trusted Server 130; and logs-in to Trusted Server 130 using his credentials (namely, user Adam's credentials for accessing his personal account at Trusted Server 130, and not at Bank-A). Then, Trusted Server 130 displays to user Adam the suspicious (or elevated-risk, or elevated-security) incoming email message from Bank-A. In a first example, user Adam sees that this is a password reset email message from Bank-A; and indicates to Trusted Server 130 that he (user Adam) has not recently requested to reset his password at B ank-A; and therefore, he wishes to discard and delete this incoming email message without acting on it; and Trusted Server 130 performs such steps accordingly and discards the incoming message; and the attack that was initiated by Attacker Mallory has been blocked or prevented. In a second example, user Adam sees that this is a password reset email message from Bank-A; and indicates to Trusted Server 130 that he (user Adam) has indeed recently requested from Bank-A to reset his password at Bank-A; and therefore, he (user Adam) wishes and intends to act on that incoming email message. For example, user Adam can now click (or tap) on the password recovery link that is included in the incoming email message, that he sees on this electronic device 121 through his personal account at Trusted Server 130 (and not through his real-life email account, which could have been compromised by Attacker Mallory); and user Adam can now safely reset his banking password at Bank-A. In a third example, user Adam can indicate to Trusted Server 130, that the incoming email message is actually a Benign email message that does not involve a security risk, and this insight may be fed into the Incoming Message Analysis Unit 131 in order to improve its message analysis or message classification process.

As demonstrated above, some embodiments may prevent or block or stop or detect an attack on a particular protected account (e.g., a banking account, an electronic commerce account, a social network account, or the like) that is based on a compromise of an email account of the genuine user; by replacing the real-life genuine email address of the genuine user, at the account profile of the protected account (e.g., the banking account), with a Replacement Email Address that is exclusively controlled and monitored by Trusted Server 130.

As demonstrated herein, some embodiments may similarly prevent or block or stop or detect an attack on a particular protected account (e.g., a banking account, an electronic commerce account, a social network account, or the like) that is based on a SIM Swap; by replacing the real-life genuine phone number of the genuine user, at the account profile of the protected account (e.g., the banking account), with a Replacement Phone Number that is exclusively controlled and monitored by Trusted Server 130.

In a demonstrative example, Attacker Michael hears user Adam tell his real-life phone number to a high-school friend that he has just met at a coffeeshop. Attacker Michael now has the real-life phone number of user Adam. Attacker Michael also sees that user Adam has a smartphone labeled with "Verizon", visibly indicating to Attacker Michael that user Adam is a customer of Verizon mobile carrier. Attacker Michael also sees that user Adam pays for his coffee with a debit card of Bank-A, and therefore Attacker Michael deduces that user Adam has a banking account with Bank-A.

Later, Attacker Michael walks into a Verizon store, and claims to be user Adam; for example, by showing a fake ID card of user Adam, or by showing an ID card that he stole from user Adam, or by correctly answering some security questions of user Adam having answers that can be found on user Adam's social network page (e.g., what is your date-of-birth, where were you born, what is your favorite movie). The customer service representative believes that Attacker Michael is the genuine user Adam. Attacker Michael, posing as user Adam, explains that he lost his phone, and that he now has a new phone and he needs a new SIM card to access his regular phone number. The customer service representative generates a new SIM card that control's user Adam's genuine phone number, and gives it to Attacker Michael who poses to be user Adam. From this moment, Attacker Michael has control over the phone number of user Adam.

Attacker Michael now uses his laptop computer to access the website or the mobile app of Bank-A. The interface of Bank-A allows users to utilize their mobile phone number as their username. Attacker Michael starts a log-in process at Bank-B, by entering the real-life mobile phone number of user Adam, and by selecting "I forget my password and I want to reset it via an SMS text message". Accordingly, the server 110 of Bank-A generates and sends out an SMS text message, with a password reset link, to the phone number that Bank-A has on file for user Adam.

In a conventional scenario, Attacker Michael—who has direct control over the phone number of user Adam due to the SIM Swap attack—could now receive directly the SMS text message (for password reset) that Bank-A sent to the real-life phone number of user Adam, and could now reset the password of user Adam at Bank-A, and could now gain control over the banking account of user Adam at Bank-A.

In contrast, in accordance with some embodiments, system 100 prevents and/or blocks and/or stops such attack from succeeding and/or from completion. As mentioned above, the account profile of user Adam at Bank-A does not include and does not know the genuine real-life phone number of user Adam. Rather, Bank-A only has (only knows) the Replacement Phone Number that was generated for user Adam by Trusted Server 130, and that was inserted by the Protection Module 141 into the "phone number" field of the account profile of user Adam at Bank-A. Accordingly, the SMS text message with the password recovery link is sent by Bank-A to that Replacement Phone Number, that is exclusively controlled and accessible by Trusted Server 130; and is not sent from Bank-A to the real-life genuine phone number of user Adam (which is not known at all to Bank-A).

Trusted Server 130 continuously monitors incoming SMS text messages that arrive to that Replacement Phone Number that it had generated for user Adam. Generally, such incoming SMS text messages are expected to be received only from Bank-A, and not from other third-parties; as this is a unique Replacement Phone Number that is not known to anyone other than to Bank-A server 110 and to the Trusted Server 130.

Trusted Server 130 detects a first incoming SMS text message that arrived to the Replacement Phone Number of user Adam. An Incoming Message Analysis Unit 131 of Trusted Server 130 performs analysis of the incoming SMS text message; for example, textual analysis, Natural Language Processing (NLP) analysis, comparison to (or detection of) pre-defined keywords or terms or phrases or links, or other analysis whose purpose is to detect whether (i) the incoming SMS text message is a Benign SMS text message from Bank-A that merely provides information to user Adam (e.g., "Please note that our branches will be closed on Monday for Memorial Day"); or conversely, (ii) the incoming SMS text message is a Suspicious email message (or a risk-entailing SMS text message, or an elevated-security SMS text message, or a security-related SMS text message) from Bank-A which allows the recipient of such SMS text message to perform a password reset or password recovery or password modification process, or which provides to the recipient of such SMS text message a unique token or One-Time Password (OTP) or one-time passcode or other data-item which can be used for resetting a password or for confirming a high-risk transaction or an elevated-security transaction (e.g., an outgoing wire transfer).

For example, the Incoming Message Analysis Unit 131 of Trusted Server 130 may check whether the incoming SMS text message from Bank-A matches, at least partially, a pre-defined known template of SMS text messages that Bank-A typically sends out to customers for password recovery, or for confirming an outgoing wire transfer; or contains a textual string of the word "password" and the word "reset" in the same sentence; or contains the phrase "Please click this link within 10 minutes to reset your banking password" (e.g., this phrase being pre-defined as one of possible phrases that Bank-A typically utilizes in its regular password reset email messages). In some embodiments, Incoming Message Analysis Unit 131 may operate based on an extensive list of pre-defined rules and keywords, that provide indicators for content that is Benign (e.g., "Memorial Day" or "Federal holiday") or for content that is Suspicious (e.g., "reset your password" or "please confirm this wire transfer"). In some embodiments, Incoming Message Analysis Unit 131 may optionally utilize a Machine Learning (ML) and/or Deep Learning (DL) and/or Artificial Intelligence (AI) and/or Neural Network (NN) engine or unit, which may be pre-trained using a training set of thousands of SMS text messages and/or email messages, to classify an incoming SMS text (or email) message as either Benign or Suspicious.

If the incoming SMS text message is determined to be Benign, then: Trusted Server 130 composes a brand-new SMS text message to user Adam, and sends it from Trusted Server 130 to the real-life genuine phone number of user Adam (which is known to Trusted Server 130, and which is not know to Bank-A server 110). The brand-new SMS text message may include an introduction portion, such as, "Hello from Trusted Server; we notify you that you received a regular non-suspicious SMS text message from Bank-A"; followed by a copy of that Benign SMS text message from Bank-A (e.g., "Our branches will be closed on Monday for Memorial Day"). This way, the Benign SMS text message from Bank-A is relayed via SMS text to the real-life genuine phone number of user Adam, who can receive it and read it as usual.

In contrast, if the incoming SMS text message from Bank-A (e.g., based on the message content, message structure, links, keywords, or other indicators) is determined by Trusted Server 130 to be Suspicious, or to be associated with an Elevated-Security transaction or an Elevated-Risk activity (e.g., based on a pre-defined list or rules that define such activities or transactions; such as, password reset, password recover, outgoing wire transfer confirmation, loan request, new credit card request, or the like); then, Trusted Server 130 does not forward (does not relay, does not send, and in some embodiments does not even convey or include) the content of that incoming SMS text message via an SMS text to user Adam's real-life phone number. Rather, Trusted Server 130 generates and sends to user Adam a message notifying him that an elevated-security SMS text has arrived from a third-party entity (naming Bank-A in some embodiments; or, in other embodiments, not even mentioning to user Adam the identity or name of the sending entity); and inviting user Adam to log-in into his personal account at Trusted Server 130 in order to view and read and review that incoming SMS text message, and in order to command Trusted Server 130 how to handle it. Such notification message to user Adam may be sent by Trusted Server 130 via SMS text to the real-life phone number of user Adam (that is known to Trusted Server 130); or, in some embodiments, may be sent to user Adam by another communication channel that was pre-defined by user Adam exactly for the purpose of notifying user Adam about suspicious SMS text messages, such as, a non-SMS communication channel, or via an SMS text message that is sent to another (secondary) real-life phone number of user Adam, or via an email text message to the real-life email address of user Adam (that is known to Trusted Server 130).

User Adam receives the notification from Trusted Server 130; and logs-in to Trusted Server 130 using his credentials (namely, user Adam's credentials for accessing his personal account at Trusted Server 130, and not at Bank-A). Then, Trusted Server 130 displays to user Adam the suspicious (or elevated-risk, or elevated-security) incoming SMS text message from Bank-A. In a first example, user Adam sees that this is a password reset SMS text message from Bank-A; and indicates to Trusted Server 130 that he (user Adam) has not recently requested to reset his password at Bank-A; and therefore, he wishes to discard and delete this incoming SMS text message without acting on it; and Trusted Server 130 performs such steps accordingly and discards the SMS text message; and the attack that was initiated by Attacker Michael has been blocked or prevented. In a second example, user Adam sees that this is a password reset email message from Bank-A; and indicates to Trusted Server 130 that he (user Adam) has indeed recently requested from Bank-A to reset his password at Bank-A; and therefore, he (user Adam) wishes and intends to act on that incoming SMS text message. For example, user Adam can now click (or tap) on the password recovery link that is included in the incoming SMS text message, that he sees on this electronic device 121 through his personal account at Trusted Server 130 (and not through his real-life SMS texting application on his smartphone, which could have been compromised by Attacker Michael via the SIM Swap attack); and user Adam can now safely reset his banking password at Bank-A. In a third example, user Adam can indicate to Trusted Server 130, that the incoming SMS text message is actually a Benign SMS text message that does not involve a security risk, and this insight may be fed into the Incoming Message Analysis Unit 131 in order to improve its message analysis or message classification process.

As demonstrated above, some embodiments may prevent or block or stop or detect an attack on a particular protected account (e.g., a banking account, an electronic commerce account, a social network account, or the like) that is based on a compromise of a phone account or a cellular phone account of the genuine user; by replacing the real-life genuine phone number of the genuine user, at the account profile of the protected account (e.g., the banking account), with a Replacement Phone Number that is exclusively controlled and monitored by Trusted Server 130.

Some embodiments may similarly protect user Adam against a SIM Swap attack, in which Attacker Michael requests from Bank-A to convey a one-time password or a one-time passcode via a voice message to the phone number that Bank-A has on file for user Adam. For example, such incoming voice call from Bank-A, would not arrive to the genuine real-life phone number of user Adam, which Attacker Michael has already compromised (via the SIM Swap attack); because Bank-A does not know and does not store the genuine real-life phone number of user Adam. Rather, the voice call or voice message would outgo from Bank-A to the Replacement Phone Number that Trusted Server 130 has generated and inserted into the banking account profile of user Adam at Bank-A; and Trusted Server 130 will transcribe (via speech-to-text conversion) the incoming voice message or voice call, and will perform on such transcript the analysis described above regarding incoming SMS text (or email) messages. If the incoming voice call or voice message from Bank-A is determined by Trusted Server 130 to be Benign, then it may be forwarded or sent or relayed or conveyed to user Adam by one or more pre-defined communication channels between Trusted Server 130 and user Adam (such as, as an audio clip that is attached to an email message from Trusted Server 130 to the real-life genuine email address of user Adam). In contrast, if the incoming voice call or voice message from Bank-A is determined by Trusted Server 130 to be Suspicious, then it is not merely forwarded or sent or relayed or conveyed to user Adam by such communication channel (which may have been compromised already by an attacker); but rather, Trusted Server 130 only sends to user Adam a notification that a Suspicious voice call or voice message has been received, and that user Adam can listen to it (and/or review its transcript) after logging-in to the personal account of user Adam at Trusted Server 130. There, user Adam can command Trusted Server 130 how to further handle that incoming voice call or voice message, or may otherwise indicate to Trusted Server 130 whether it is indeed suspicious or is actually benign.

In accordance with some embodiments, the Replacement Email Address is generated by a Replacement Email Address Generator 133 of Trusted Server 130; and is inserted into the "email address" field of the form or interface of Bank-A by a Replacement Email Address Inserter Module 143 (which may be part of Protector Module 141) which receives the Replacement Email Address over a secure link from the Trusted Server 130.

In accordance with some embodiments, the Replacement Email Address is unique per protected end-user (e.g., genuine user Adam, genuine user Bob) and per protected entity (e.g., Bank-A, Bank B). For example, when genuine user Adam opens a banking account at Bank-A, the Trusted Server 130 generates and inserts for him a first Replacement Email Address (e.g., "Random-1234 @Trusted.com") into the "email address" field of the account profile interface of Bank-A; later, when genuine user Adam opens a banking account at Bank-B, the Trusted Server 130 generates and inserts for him a second, different, Replacement Email Address (e.g., "Random-5678 @Trusted.com") into the "email address" field of the account profile interface of Bank-B; later, when genuine user Bob opens a banking account at Bank-A, the Trusted Server 130 generates and inserts for him a third, different, Replacement Email Address (e.g., "Random-6543 @Trusted.com") into the "email address" field of the account profile interface of Bank-A; and later, when genuine user Bob opens a banking account at Bank-B, the Trusted Server 130 generates and inserts for him a fourth, different, Replacement Email Address (e.g., "Random-4836 @ Trusted.com") into the "email address" field of the account profile interface of Bank-B.

In accordance with some embodiments, the Replacement Phone Number is generated by a Replacement Phone Number Generator 134 of Trusted Server 130; and is inserted into the "phone number" field of the form or interface of Bank-A by a Replacement Phone Number Inserter Module 144 (which may be part of Protector Module 141) which receives the Replacement Phone Number over a secure link from the Trusted Server 130.

In accordance with some embodiments, the Replacement Phone Number is unique per protected end-user (e.g., genuine user Adam, genuine user Bob) and per protected entity (e.g., Bank-A, Bank B). For example, when genuine user Adam opens a banking account at Bank-A, the Trusted Server 130 generates and inserts for him a first Replacement Phone Number (e.g., "917-234-5678") into the "Phone Number" field of the account profile interface of Bank-A; later, when genuine user Adam opens a banking account at Bank-B, the Trusted Server 130 generates and inserts for him a second, different, Replacement Phone Number (e.g., "917-543-9876") into the "Phone Number" field of the account profile interface of Bank-B; later, when genuine user Bob opens a banking account at Bank-A, the Trusted Server 130 generates and inserts for him a third, different, Replacement Phone Number (e.g., "917-6521-763") into the "Phone Number" field of the account profile interface of Bank-A; and later, when genuine user Bob opens a banking account at Bank-B, the Trusted Server 130 generates and inserts for him a fourth, different, Replacement Phone Number (e.g., "917-642-9752") into the "Phone Number" field of the account profile interface of Bank-B.

In some embodiments, the Replacement Email Address and/or the Replacement Phone Number may be generated based on one or more pre-defined rules; for example, using a random or pseudo-random number generator, which generates a random or pseudo-random number that is then converted to a character; using a random or pseudo-random string of characters, that is used as a portion of an email address, and is followed by a trusted domain name that is controlled by the Trusted Server 130; by selecting a secret phone number from a list of already-prepared dedicated and secret phone numbers or virtual phone numbers that are controlled by Trusted Server 130; and/or by other suitable means.

In some embodiments, the Protector Module 141 may be configured to automatically replace the email address and/or the phone number, that Bank-A has on file or on record for user Adam, upon each and every log-in of user Adam to his Bank-A banking account; and/or every N days (wherein N is a pre-defined positive number); and/or upon every receipt of an incoming message (incoming email message and/or incoming SMS text message and/or incoming voice call or voice message) that arrives to the Replacement email address/phone number that was previously generated; in order to improve or enhance the security and resilience of the protection, and/or to ensure that even the Replacement phone number/email address cannot be used more than one time (per user per protected account).

Some embodiments may be utilized, similarly, for replacing and/or protecting other Contact Details data-items that a genuine user may provide to an entity (e.g., a bank, an online retailer, a social network); similarly to replacing a phone number or an email address of the genuine user; for example, a chat or Instant Messaging username or contact data-item, or the like.

In some embodiments, the Trusted Server 130 and/or the Protection Module 141 may be configured, or may operate, to replace an already-entered real-life contact detail (e.g., phone number, email address) of the genuine user, with a freshly-generated Replacement contact detail (e.g., Replacement phone number, Replacement email address). For example, user Carla already has a bank account at Bank-C, and already has a banking profile at Bank-C that already stores her genuine real-life phone number and her genuine real-life email address. User Carla opens a personal account with Trusted Server 130, and creates her personal profile there, indicating to Trusted Server 130 her genuine real-life phone number and email address. Optionally, user Carla may also indicate to Trusted Server 130, that she already has a banking account with Bank-C; and in response, Trusted Server 130 may guide user Carla to log-in into her Bank-C account, and to click on "edit my account profile", and to reach the form or the interface that allows user Carla to edit her phone number and/or email address; and at that form or interface, the Protection Module 141 may automatically insert the Replacement Email Address and the Replacement Phone Number, that Trusted Server 130 generates for user Carla's banking account at Bank-C, into their respective "email address" field and "phone number" field at the form or interface of Bank-C; and thus updates and/or modifies and/or overwrites the genuine real-life contact details of user Carla, with the Replacement contact details that are controlled and are accessible only by Trusted Server 130; thereby providing to user Carla, from that moment onwards, protection against the various types of attacks that were described above and/or against other types of attacks that may utilize (directly or indirectly) a compromised phone number or a compromised email account.

In some embodiments, Trusted Server 130 may be configured to automatically parse and process, via an Incoming Message Parsing Unit 135, an incoming message (email or SMS text or voice call or voice message) that requires the genuine user to perform a password reset process or to confirm an elevated-security transaction; and may further be configured to automatically replace that contact details of the genuine user, that are stored at the banking profile of the genuine user at Bank-A, after (or during) every log-in session of the genuine user into his banking account at Bank-A; thereby enabling the Trusted Server 130, upon suitable configuration, to automatically change the replacement contact details every N hours or every N days, or upon every log-in session, or upon receiving of a single incoming message to the replacement contact details, or upon receiving N incoming messages to the replacement total details.

In some embodiments, optionally, Trusted Server 130 and the Protection Module 141 may be configured to enable them to parse, at the remote Trusted Server 130, an incoming message that arrived to the Replacement email address/phone number; to extract from the incoming message a one-time password or a one-time passcode (OTP); and to automatically insert such OTP, via the Protection Module 141 that runs on the electronic device 121 of the genuine user (or via a Data-Item Insertion Module 145 thereof), into the suitable field of the form or interface that requires the genuine user to enter such OTP; for example, since the genuine user may be concurrently and continuously authenticated towards the Trusted Server 130 via a continuous authentication mechanism (e.g., using a live video/camera stream that continuously captures images or video of the genuine user and transmits them to the Trusted Server 130 for user authentication purposes); thereby further providing to the genuine user a smooth, efficient, and friction-less or effort-less or reduced-friction or reduced-effort mechanism for insertion of such OTP into the required field or form or interface.

In some embodiments, the Trusted Server 130 and the Protection Module 141 hold in confidence or in secrecy, and do not disclose and do not reveal to the user, an OTP that has arrived to said user via an incoming SMS text message (to his Replacement Phone Number) or via an incoming email message (to his Replacement Email Address); but rather, the Trusted Server 130 and the Protection Module 141 keeps the OTP confidential and non-revealed to the user and non-delivered to the user (via email or via SMS text), until the genuine user performs a secure authentication into a secure channel (e.g., authentication towards the Trusted Server 130), which only then allows the genuine user to view, handle, approve and/or discard such incoming message(s) via such secure channel or secure interface.

In some embodiments, the Protection Module 141 continuously monitors interactions of the user and/or content that is served to the user's electronic device (e.g., by the website of Bank-A or by the mobile app of Bank-A), and automatically detects that the user is requested to enter his genuine email address/phone number; and automatically proceeds to generate Replacement data-items (email address/phone number) and to automatically insert them into the relevant field(s) in the account settings page or the account profile page or other suitable page of the computerized service. In other embodiments, the Replacement email address/phone number is generated by the Trusted Server 130 and the Protection Module 141, and is optionally copied to the clipboard of the electronic device, such that the genuine user can then manually insert or paste the Replacement email address/phone number into the relevant field(s). In some embodiments, optionally, the Protection Module 141 may detect that the user is engaging with (or interacting with, or accessing) a particular website or web-page or mobile application (e.g., a banking website; or, the particular website of Bank-A; or, a web-page that requires the user to enter an email address or a phone number), and may then automatically guide the user's electronic device to access a particular Account Settings/Account Profile page in order to enable manual or automatic or semi-automatic insertion of the Replacement phone number/email address into the relevant field(s).

Some embodiments may block attacks, or account compromising operations by an attacker, that are performed even while the genuine user is concurrently logged-in to his banking account; and/or that are performed by compromising a phone number and/or an email account of the genuine user; and/or that are performed while the genuine user is not utilizing his email account and/or his phone (e.g., temporarily, or for a few hours); and/or without requiring any integration between the Trusted Server 130 and the banking (or protected) server 110; and/or without requiring the banking (or protected) server to provide any authorization or any access privileges or any API integration towards the Trusted Server 130 and/or towards the Protection Module 141 that runs on the electronic device 121; and/or without relying in any way, and without requiring any cooperation from, the bank (or other entity) that runs the server 110 on which the genuine user has his personal account that the end-user wishes to protect against attacks.

Some embodiments may thus provide a system and method which delegates to a trusted third party, or to an independent or external or system that is not the end-user or the customer himself, or to a third-party who is not the owner or the holder of the electronic device, or to an external or remote service that can be securely accessed by the end-user or by the customer through a different and more secure channel (e.g., different from the SMS/Email channel through which the original incoming message was conveyed) the functionality or the capability to handle elevated-security transactions and/or increased-security transactions and/or to handle transactions or incoming messages that require (or that include) an OTP or an authentication code. Some embodiments may perform tokenization of some or all of the relevant authentication factors or other factors (or credentials) that server as access points and/or as operation enablers and/or transaction enablers (e.g., password, step-up authentication means, OTP sent over email/SMS text, recovery or resetting of password), and by blocking or preventing the ability of any attacker to access a user account and/or to perform a sensitive (or elevated-security or increased-security) action or transaction in the account, without performing the secure authentication via a secure channel to the trusted third-party sever or application or service, which acts as a replacement contact hub for such incoming email/SMS text messages and which acts as (and provides) a new layer of protection to the end-user. In some embodiments, the system may be configured to perform tokenization of combination of authentication factors, such as Password+Incoming Email code, or Password+Incoming SMS text code, or Password+ Incoming Email code+Incoming SMS text code, or other suitable combination; which is replaced by the trusted server or the trusted application or "app" or service, that the genuine end-user must securely access (or, to which the genuine user should be securely logged-in) in order to approve or perform such elevated-security transactions. In some embodiments, other data-items or contact data-items or authentication factors of an end-user may similarly be replaced, or may similarly be subject to said tokenization process; for example, by replacing and/or tokenizing a social media/social network username or address (e.g., Facebook/ LinkedIn username of the genuine user; WhatsApp/Signal/ Telegram messaging username or nickname or handle) which may be utilized (in some situations) for logging-in to another account or service and/or which may be utilized by such other services or accounts in order to convey an authentication factor or an OTP or other data-item which may be required for performing or approving a sensitive transaction.

In some embodiments, the Protection Module 141 may further be configured to automatically elevate the security setting for any service or account or website or app, that the Protection Module 141 protects, or to some of them that can be pre-defined by the user and/or by a system administrator (e.g., only Banking websites/apps), to the Highest Possible level of security settings; and to automatically perform the tokenization and replacement of the relevant contact details (e.g., email address, phone number) of the genuine user with replacement contact details that are controlled by the Trusted Server; and to perform such elevating (or leveraging), and such replacement, automatically via auto-fill operations that are performed by the Protection Module 141. For example, user Frank is a customer of Bank-C; user Frank has never requested from Bank-C to use two-factor authentication or two-step authentication; user Frank decides to start using the Protection Module 141, which in turn recognizes that user Frank is interacting with Bank-C; and therefore, the Protection Module 141 automatically or semi-automatically accesses the Security Settings page or tab of the website (or app) of Bank-C, and pro-actively toggles there the option of "Always Use Two-Step Authentication for Logging-In" from No to Yes, and also pro-actively toggles there the option of "Always Use Two-Step Authentication for Outgoing Wire Transfers" from No to Yes, thereby elevating the Security Settings to the highest possible settings that Bank-C allows; and the Protection Module 141 in conjunction with the Trusted Server proceed to generate tokenized replacement contact details (e.g., replacement email address; replacement phone number) that are controlled by the Trusted Server, and to enter or insert them into the relevant fields in the Security Settings page or tab or screen, either automatically or semi-automatically or manually (e.g., by providing the replacement data to user Frank who then performs a Paste operation from the clipboard). The system or the Protection Module 141 may be configured to know, in advance and also in a dynamically updated way, that Bank-C indeed offers elevated security options for Outgoing Wire Transactions, and therefore to perform such leverage or elevation when the user engages with Bank-C; and the system or the Protection Module 141 may be configured to know, in advance and also in a dynamically updated way, that Bank-D does not offer elevated security options for Outgoing Wire Transactions, and therefore it cannot support a further elevation of security settings when the user engages with Bank-D. In some embodiments, the Protection Module 141 may detect and select (or activate) the most secure setting or the highest-possible security setting, that the account (which is being protected) allows, in order to protect as much as possible the authentication factors that are required, and to also smoothen and facilitate the user experience with via automatic filling or semi-automatically filling everything in the background. In some embodiments, the entire process of such elevation of security settings and/or tokenization/replacement of contact details (or authentication factors) of the user, may be performed while the end-user is being continuously authenticated to the Trusted Server and/or to the Protection Module 141 via a continuous secure authentication channel (e.g., a biometric or video-based or image-based authentication channel that may be performed continuously in the background, in a seamless and transparent manner).

Some embodiments perform escalation or automatic escalation or semi-automatic escalation, or leverage or maximization, of the security settings of a service or an account; and then perform tokenization replacement of the Data-Item that is used as authentication factor with a Replacement Data-Item, that causes the same authentication factor (e.g., SMS text, email) to remain utilized but to be re-routed to the Trusted Server, which is better equipped to handle and monitor incoming messages; and such that the end-user is required to utilize a different, secure, communication channel—which is different from that same authentication factor (SMS text, email)—in order to access any such incoming message and to command the system whether to approve it or reject it. It is noted that the Authentication Factor itself is Not replaced; for example, the security settings remain (or, are escalated to) utilization of SMS text, and only the Phone Number that is used within said Authentication Factor is replaced to a Replacement Phone Number controlled exclusively by the Trusted server; or similarly, the security settings remain (or, are escalated to) utilization of Email, and only the Email Address that is used within said Authentication Factor is replaced to a Replacement Email Address controlled exclusively by the Trusted server. Then, in order to view or access any such message that came in, via that Authentication Factor, the end-user must use A Different communication channel—that is not the same channel as that Authentication Factor; for example, if the Authentication Factor is (and remains) SMS text, then a non-SMS channel must be used by the end-user (such as, via a secured App, or via secure/biometric login into the Trusted Server or into a website thereof) in order to view the content of such incoming SMS text that was re-routed to a Replacement Phone Number controlled by the Trusted Server; or similarly, if the Authentication Factor is (and remains) Email, then a non-Email channel must be used by the end-user (such as, via a secured App, or via secure/biometric login into the Trusted Server or into a website thereof) in order to view the content of such incoming Email Message that was re-routed to a Replacement Email Address controlled by the Trusted Server. It is noted that Email and SMS Text are only demonstrative and non-limiting examples; and some embodiments may similarly perform replacement and tokenization of the data-item or the contact-item that is utilized in other types of authentication factors (e.g., social media/social network, WhatsApp/Telegram/Signal messaging, or the like).

In some embodiments, a method comprises: (a) detecting that a user is requested to input his genuine email address into an email address field of an account profile page or an account settings page of a computerized service; (b) inserting, into said email address field of said page, a replacement email address that replaces a genuine email address of said genuine user at said computerized service; (c) automatically monitoring and handling, continuously at a remote server or remote service, incoming email messages that arrive to said replacement email address of said genuine user and that request the genuine user to perform an elevated-security operation or to reset his credentials for accessing said computerized service.

In some embodiments, the method further comprises: (d1) at said remote server, performing analysis of an incoming email message, that arrives to said replacement email address; (d2) if the analysis indicates that said incoming email message is not requesting from said genuine user to perform an elevated-security operation, then: forwarding said incoming email message from the replacement email address to the genuine email address of the genuine user; else, preventing delivery of said incoming email message to the genuine email address of the genuine user, and instead performing: delivering to the genuine user an indication that an incoming email message that is related to an elevated-security operation was received at said replacement email address; and enabling said genuine user to view said incoming email message via a secure channel and not via regular email access of said genuine user to said genuine email address.

In some embodiments, the replacement email address is unknown to said genuine user and is not displayed to said genuine user. In some embodiments, the computerized service and its servers do not even know that the Replacement Email Address is not controlled by the genuine end-user; and they do not know that (in some implementations) the Replacement Email Address is not even known to the genuine end-user; and they do not even know that email messages that they will send to that Replacement Email Address would not be directly delivered to the genuine email address of the genuine end-user, but rather, would be rerouted to or intercepted by the Trusted Server (or Trusted Service) that monitors and blocks such incoming messages and analyzes them for security content, and selectively allows the genuine end-user to view them via Another, different, more secure, communication channel and not by merely receiving a plain email message at his genuine email address.

In some embodiments, said replacement email address is generated automatically by said remote server for said genuine user, by generating an email address string that includes (i) a pseudo-random string-portion, and (ii) a domain that is a trusted domain that is controlled exclusively by said remote server.

In some embodiments, said replacement email address is generated automatically by said remote server for said genuine user, by selecting a next-available email address string from a pre-defined list of replacement email address strings, wherein each replacement email address string on said list includes (i) a pseudo-random string-portion, and (ii) a domain that is a trusted domain that is controlled exclusively by said remote server.

In some embodiments, step (b) is performed only by a client-side application that runs on said electronic device of the genuine user, and wherein step (b) is not performed by an application that runs on a server of said computerized service.

In some embodiments, step (b) is performed by a client-side module, that runs only on said electronic device of said genuine user; wherein said client-side module is a module selected from the group consisting of: a web browser extension, a web browser add-on, a web browser toolbar, a web browser plug-in.

In some embodiments, step (b) is performed by a client-side module, that runs only on said electronic device of said genuine user; wherein said client-side module is a native application, that runs on said electronic device of said genuine user, in parallel to a web browser that said genuine user is utilizing to access said computerized service.

In some embodiments, step (b) is performed by a client-side module, that runs only on said electronic device of said genuine user; wherein said client-side module is a native application, that runs on said electronic device of said genuine user, in parallel to another native application that said genuine user is utilizing to access said computerized service.

In some embodiments, the analysis of incoming email messages that arrive from said computerized service to said replacement email address, comprises at least: textual analysis that determines whether an incoming email message includes one or more pre-defined keywords or phrases that are pre-defined as being associated with a credentials reset message or with elevated-security transactions.

In some embodiments, the replacement email address is unknown to said genuine user. and is not visible to said genuine user, and is not displayed to said genuine user, and cannot be discovered by said genuine user.

In some embodiments, the replacement email address is unique per user and per computerized service; wherein a first genuine user is protected by a first replacement email address for his interactions with a first computerized service; wherein the first genuine user is protected by a second, different, replacement email address for his interactions with a second computerized service; wherein a second genuine user is protected by a third replacement email address for his interactions with the first computerized service; wherein the second genuine user is protected by a fourth, different, replacement email address for his interactions with the second computerized service.

In some embodiments, wherein the inserting of the replacement email address comprises: accessing a dedicated form of said computerized service that is intended for modification of user contact details; and over-writing a previously-typed email address of said genuine user by said replacement email address.

In some embodiments, the method further comprises: automatically inserting a new, different, replacement email address to the email address field of said genuine user at said computerized service, every N hours; wherein N is a pre-defined positive number.

In some embodiments, the method further comprises: automatically inserting a new, different, replacement email address to the email address field of said genuine user at said computerized service, after every log-in session of said genuine user into said computerized service.

In some embodiments, the computerized service is an online service selected from the group consisting of: an online banking system, an online brokerage account system, an online electronic commerce system, an online social network.

In some embodiments, a method comprises: (a) detecting that a user is requested to input his genuine phone number into a phone number field of an account profile page or an account settings page of a computerized service; (b) inserting, into said phone number field of said page, a replacement phone number that replaces a genuine phone number of said genuine user at said computerized service; (c) automatically monitoring and handling, continuously at a remote server or a remote service, incoming SMS text that arrive to said replacement email address of said genuine user and that request the genuine user to perform an elevated-security operation or to reset his credentials for accessing said computerized service.

In some embodiments, the method further comprises: (d1) at said remote server, performing analysis of an incoming SMS text message, that arrives to said replacement phone number; (d2) if the analysis indicates that said incoming SMS text message is not requesting from said genuine user to perform an elevated-security operation, then: forwarding said incoming SMS text message from the replacement phone number to the genuine phone number of the genuine user; else, preventing delivery of said incoming SMS text message to the genuine phone number of the genuine user, and instead performing: delivering to the genuine user an indication that an incoming SMS text that is related to an elevated-security operation was received at said replacement phone number; and enabling said genuine user to view said incoming SMS text via a secure channel and not via regular access to SMS text messages on his said genuine phone number.

In some embodiments, the replacement phone number is unknown to said genuine user and is not displayed to said genuine user. In some embodiments, the computerized service and its servers do not even know that the Replacement Phone Number (and its incoming SMS text messages) is/are not controlled by the genuine end-user; and they do not know that (in some implementations) the Replacement Phone Number is not even known to the genuine end-user; and they do not even know that SMS Text mail messages that they will send to that Replacement Phone Number would not be directly delivered to the genuine phone number of the genuine end-user, but rather, would be rerouted to or intercepted by the Trusted Server (or Trusted Service) that monitors and blocks such incoming messages and analyzes them for security content, and selectively allows the genuine end-user to view them via Another, different, more secure, communication channel and not by merely receiving a plain SMS Text message at his genuine phone number.

In some embodiments, said replacement phone number is generated automatically by said remote server for said genuine user, by selecting a next-available phone number string from a pre-defined list of replacement phone number strings.

In some embodiments, step (b) is performed only by a client-side application that runs on said electronic device of the genuine user, and wherein step (b) is not performed by an application that runs on a server of said computerized service.

In some embodiments, step (b) is performed by a client-side module, that runs only on said electronic device of said genuine user; wherein said client-side module is a module selected from the group consisting of: a web browser extension, a web browser add-on, a web browser toolbar, a web browser plug-in.

In some embodiments, step (b) is performed by a client-side module, that runs only on said electronic device of said genuine user; wherein said client-side module is a native application, that runs on said electronic device of said genuine user, in parallel to a web browser that said genuine user is utilizing to access said computerized service.

In some embodiments, step (b) is performed by a client-side module, that runs only on said electronic device of said genuine user; wherein said client-side module is a native application, that runs on said electronic device of said genuine user, in parallel to another native application that said genuine user is utilizing to access said computerized service.

In some embodiments, the analysis of incoming SMS text messages that arrive from said computerized service to said replacement phone number, comprises at least: textual analysis that determines whether an incoming SMS text message includes one or more pre-defined keywords or phrases that are pre-defined as being associated with a credentials reset message or with elevated-security transactions.

In some embodiments, the replacement phone number is unknown to said genuine user. and is not visible to said genuine user, and is not displayed to said genuine user, and cannot be discovered by said genuine user.

In some embodiments, the replacement phone number is unique per user and per computerized service; wherein a first genuine user is protected by a first replacement phone number for his interactions with a first computerized service; wherein the first genuine user is protected by a second, different, replacement phone number for his interactions with a second computerized service; wherein a second genuine user is protected by a third replacement phone number for his interactions with the first computerized service; wherein the second genuine user is protected by a fourth, different, replacement phone number for his interactions with the second computerized service.

In some embodiments, the inserting of the replacement phone number comprises: accessing a dedicated form of said computerized service that is intended for modification of user contact details; and over-writing a previously-typed phone number of said genuine user by said replacement phone number.

In some embodiments, the method further comprises: automatically inserting a new, different, replacement phone number to the phone number field of said genuine user at said computerized service, every N hours; wherein N is a pre-defined positive number.

In some embodiments, the method further comprises: automatically inserting a new, different, replacement phone number to the phone number field of said genuine user at said computerized service, after every log-in session of said genuine user into said computerized service.

In some embodiments, the computerized service is an online service selected from the group consisting of: an online banking system, an online brokerage account system, an online electronic commerce system, an online social network.

In some embodiments, a process comprises: in a computerized system that uses a particular type of Authentication Factor, replacing (i) a genuine end-user Contact Data-Item or Personal Account Information Item, that is utilized by said Authentication Factor for elevated-security transactions or activity, with (ii) a Replacement Contact or a Replacement Account Information Item, that is exclusively controlled and monitored by a trusted service and not by the genuine end-user an Contact Data-Item or Personal Account Information Item of said genuine end-user. Messages that said computerized system conveys via said Authentication Factor, are not directly delivered to the Contact Data-Item or Personal Account Information Item of said genuine end-user, but rather, are delivered to said Replacement Contact that is exclusively controlled and monitored by said trusted service, and wherein said messages become accessible to said genuine end-user only via a secure communication channel that is a different communication channel from said Authentication Factor.

In some embodiments, an original communication channel of One Time Password (OTP) via an Email Message, is maintained as Authentication Factor for accessing said computerized service or for approving an elevated-security transaction or an elevated-security activity; but instead of routing an Email Message to the genuine email address of the genuine end-user, a Replacement Email Address that was inserted into an Email Address field at an Account Settings page of the computerized service causes a re-routing of said Email Message to said Replacement Email Address that is controlled exclusively by said Trusted Service; and requires the genuine end-user to utilize a different communication channel, that is different from Email and that is more secure than Email, in order to view and handle said Email Message.

In some embodiments, an original communication channel of One Time Password (OTP) via an SMS Text Message, is maintained as Authentication Factor for accessing said computerized service or for approving an elevated-security transaction or activity; but, instead of routing an SMS Text Message to the genuine phone number of the genuine end-user, a Replacement Phone Number that was inserted into a Phone Number field at an Account Settings page of the computerized service causes a re-routing of said SMS Text Message to said Replacement Phone Number that is controlled exclusively by said Trusted Service; and requires the genuine end-user to utilize a different communication channel, that is different from SMS Text and that is more secure than SMS Text, in order to view and handle said Email Message.

In some embodiments, the method comprises: escalating and elevating a level of secure communication, that is required by said computerized service as a requirement for performing a particular activity or transaction; by replacing a Genuine Contact Detail of the genuine end-user, in an Account Settings page of said computerized service, with a Replacement Contact Detail that is not directly accessible by said genuine end-user, and that is exclusively accessible and controllable by said Trusted Service; wherein said replacing is performed without requiring said computerized service to perform additional operations or to have additional configurations on its side; wherein said computerized service and its servers are not even aware that messages that they send to the Replacement Contact Detail are not actually received by the genuine end-user via his regular Genuine Contact Detail, but rather, are routed to another, more secure, communication channel that is exclusively controlled by said Trusted Service.

Although portions of the discussion herein relate, for demonstrative purposes, to wired links and/or wired communications, some embodiments are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Any one or more of the components or units described above and/or herein may be implemented by using a suitable combination of hardware components and/or software components; for example, a processor, a processing core, a Central Processing Unit (CPU), a Graphics Processing Unit (GPU), a Digital Signal Processor (DSP), a controller, an Integrated Circuit (IC), a logic circuit; a short-term memory unit (e.g., Random Access Memory (RAM), Flash memory); a long-term storage unit (e.g., hard disk drive, solid state drive, Flash drive); an input unit (e.g., keyboard, keypad, touch-screen, mouse, pointing device, microphone); an output unit (e.g., screen, touch-screen, display unit, audio speakers); wired transceivers and/or wireless transceivers (e.g., Ethernet card, Network Interface Card (NIC), modem, Wi-Fi transceiver, cellular transceiver, Bluetooth transceiver); a power source (battery, rechargeable battery, power cell, mains electricity); an Operating System (OS), drivers, applications, and/or other suitable components.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, MATLAB, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may be used in, or in conjunction with, various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a tablet, an on-board device, an off-board device, a hybrid device, a vehicular device, a non-vehicular device, a mobile or portable device, a consumer device, a non-mobile or non-portable device, an appliance, a wireless communication station, a wireless communication device, a wireless Access Point (AP), a wired or wireless router or gateway or switch or hub, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), or the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA or handheld device which incorporates wireless communication capabilities, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may comprise, or may be implemented by using, an "app" or application which may be downloaded or obtained from an "app store" or "applications store", for free or for a fee, or which may be pre-installed on a computing device or electronic device, or which may be otherwise transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A method comprising:
   (a) detecting that a user is requested to input a genuine phone number of the user into a phone number field of an account profile page or an account settings page of a computerized service;
   (b) inserting, into said phone number field of said account profile page or said account settings page, a replacement phone number that replaces the genuine phone number of said user at said computerized service;
   (c) automatically monitoring and handling, continuously at a remote server, incoming SMS text messages that arrive to said replacement phone number of said user and that request the user to perform an elevated-security operation or to reset user credentials for accessing said computerized service;
   wherein the monitoring and handling of step (c) comprise:
   (c1) at said remote server, performing analysis of an incoming SMS text message that arrives to said replacement phone number;
   (c2) if the analysis indicates that said incoming SMS text message is not requesting from said user to perform an elevated-security operation or to reset user credentials, then: forwarding said incoming SMS text message from the replacement phone number to the genuine phone number of the user;
   else, preventing delivery of said incoming SMS text message to the genuine phone number of the user, and instead performing: delivering to the user an indication that an incoming SMS text message, which is requesting from the user to perform an elevated-security operation or to reset user credentials, was received at said replacement phone number; and enabling the user to view said incoming SMS text message via a secure channel and not via regular access to SMS text messages on said genuine phone number.

2. The method of claim 1,
wherein the replacement phone number is unknown to said user and is not displayed to said user.

3. The method of claim 1,
wherein step (b) is performed only by a client-side application that runs on an electronic device of the user, and wherein step (b) is not performed by an application that runs on a server of said computerized service.

4. The method of claim 1,
wherein step (b) is performed by a client-side, module that runs only on an electronic device of said user;
wherein said client-side module is a module selected from the group consisting of: a web browser extension, a web browser add-on, a web browser toolbar, a web browser plug-in.

5. The method of claim 1,
wherein step (b) is performed by a client-side module that runs only on an electronic device of said user;
wherein said client-side module is a native application that runs on an electronic device of said user, in parallel to a web browser that said user is utilizing to access said computerized service.

6. The method of claim 1,
wherein step (b) is performed by a client-side module that runs only on an electronic device of said user;
wherein said client-side module is a native application that runs on said electronic device of said user, in parallel to another native application that said user is utilizing to access said computerized service.

7. The method of claim 1,
wherein the analysis of said incoming SMS text messages that arrives from said computerized service to said replacement phone number, comprises at least:
a textual analysis that determines whether said incoming SMS text message includes one or more pre-defined keywords or phrases that are pre-defined as being associated with a credential reset message or with elevated-security transactions.

8. The method of claim 1,
wherein the replacement phone number is unknown to said user and is not visible to said user, and is not displayed to said user, and cannot be discovered by said user.

9. A method comprising:
(a) detecting that a user is requested to input a genuine phone number of the user into a phone number field of an account profile page or an account settings page of a computerized service;
(b) inserting, into said phone number field of said account profile page or said account settings page, a replacement phone number that replaces the genuine phone number of said user at said computerized service;
wherein said replacement phone number is generated automatically by said remote server for said user, by selecting a next-available phone number string from a pre-defined list of replacement phone number strings.

10. A method comprising:
(a) detecting that a user is requested to input a genuine phone number of the user into a phone number field of an account profile page or an account settings page of a computerized service;
(b) inserting, into said phone number field of said account profile page or said account settings page, a replacement phone number that replaces the genuine phone number of said user at said computerized service;
wherein the replacement phone number is unique per user and per computerized service;
wherein a first user is protected by a first replacement phone number for interactions of said first user with a first computerized service;
wherein the first user is protected by a second, different, replacement phone number for interactions of said first user with a second computerized service;
wherein a second user is protected by a third replacement phone number for interactions of said second user with the first computerized service;
wherein the second user is protected by a fourth, different, replacement phone number for interactions of said second user with the second computerized service.

11. A method comprising:
(a) detecting that a user is requested to input a genuine phone number of the user into a phone number field of an account profile page or an account settings page of a computerized service;
(b) inserting, into said phone number field of said account profile page or said account settings page, a replacement phone number that replaces the genuine phone number of said user at said computerized service;
wherein the inserting of the replacement phone number comprises:
accessing a dedicated form of said computerized service that is intended for modification of user contact details; and over-writing a previously-typed phone number of said user by said replacement phone number.

12. The method of claim 11,
wherein the computerized service is an online service selected from the group consisting of:
an online banking system,
an online brokerage account system,
an online electronic commerce system,
an online social network.

13. A method comprising:
(a) detecting that a user is requested to input a genuine phone number of the user into a phone number field of an account profile page or an account settings page of a computerized service;
(b) inserting, into said phone number field of said account profile page or said account settings page, a replacement phone number that replaces the genuine phone number of said user at said computerized service;
wherein the method comprises:
automatically inserting a new, different, replacement phone number to the phone number field of said user at said computerized service, every N hours; wherein N is a pre-defined positive number.

14. A method comprising:
(a) detecting that a user is requested to input a genuine phone number of the user into a phone number field of an account profile page or an account settings page of a computerized service;
(b) inserting, into said phone number field of said account profile page or said account settings page, a replacement phone number that replaces the genuine phone number of said user at said computerized service;
wherein the method comprises:
automatically inserting a new, different, replacement phone number to the phone number field of said user at said computerized service, after every log-in session of said user into said computerized service.

\* \* \* \* \*